United States Patent Office 2,693,422
Patented Nov. 2, 1954

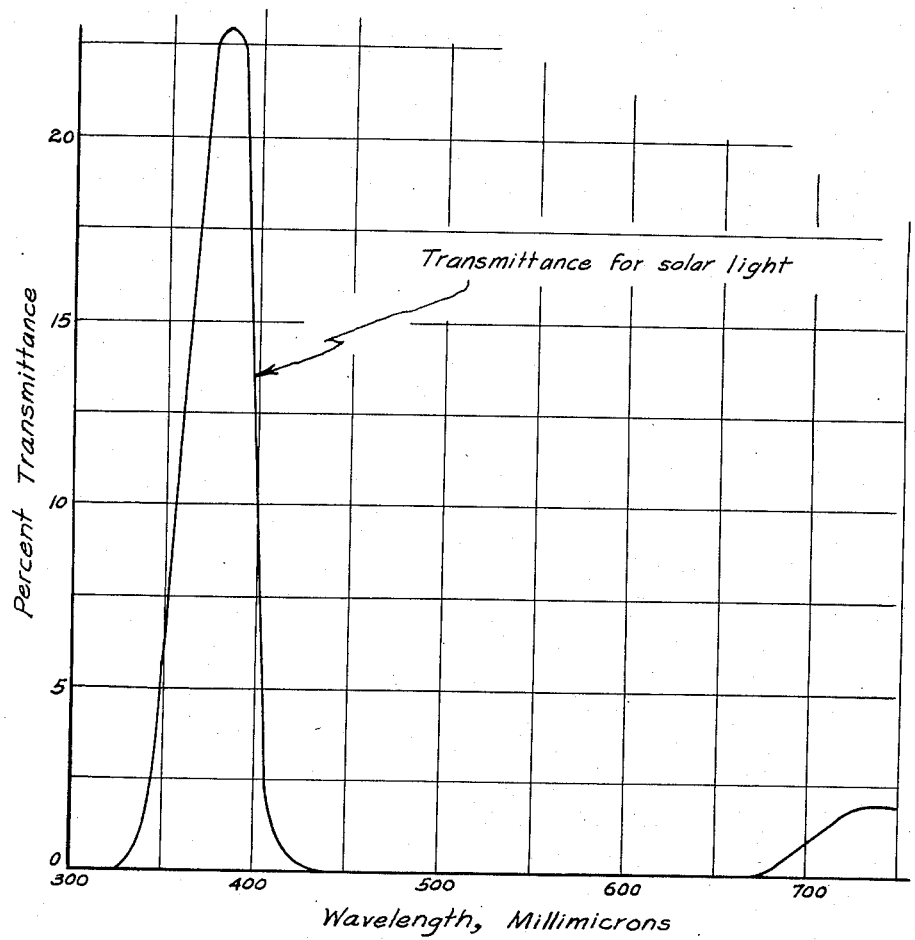

2,693,422

COMPOSITION OF GLASS HAVING HIGH ULTRA-VIOLET AND LOW VISUAL TRANSMISSION

James Earle Duncan, Brackenridge, and John J. Smith, Tarentum, Pa., assignors to Pittsburgh Plate Glass Company Application August 25, 1951, Serial No. 243,698

2 Claims. (Cl. 106—52)

This invention pertains to glass composition, and more particularly to an improved glass composition characterized by high transmission in the ultraviolet region and substantial opacity in the visible portion of the spectrum.

It has already been proposed to formulate glass compositions, for example for use as optical filters, having ultraviolet light transmitting characteristics, and various combinations of copper and nickel oxides as coloring agents in such glasses are known. However, all such prior proposals, so far as we are aware, achieve the desired results only to a degree. Moreover, the teachings of the prior art do not indicate completely the combinations of active principles which provide the desired spectral transmittance characteristics.

It is accordingly a principal object of the present invention to provide a formulation for a filter glass having high transmittance in the ultraviolet of the solar spectrum and high or substantially complete opacity in the visible portion of that spectrum.

A further object of the invention is to provide an optical filter glass having relatively high transmission in the region from 350 to 400 m$\mu$ (millimicrons) and which will absorb substantially all of the visible radiation, for example from 440 to 750 m$\mu$.

Still another object of the invention is to define a range of constituents for a glass formulation within which the above objects are achieved.

The above and other objects and advantages of the invention will best be understood from the following detailed specification of a preferred formulation for a filter glass having the desired properties. The single figure of the appended drawing represents graphically a typical spectral transmittance curve for a filter glass made in accordance with the teachings of this invention.

In general, the objects of the invention are accomplished by the addition to a conventional glass composition formula (chosen so as to be free from components excessively absorbtive of ultraviolet light), of a mixture of metallic oxides for absorbing the unwanted visible portion of the solar spectrum. These added metallic oxides are the oxides of copper, nickel and cobalt, the amounts and permissible ranges of which are specified in detail below in Table I. We have found it to be quite important to avoid the inclusion of iron oxide in the coloring material, because while iron oxide is often employed to aid in the absorption of the longer (red) wave lengths of the visual spectrum, it has the disadvantage that unless maintained in the condition of ferrous ions, this material will also absorb undue amounts of the near ultraviolet. Manganese is also preferably avoided in view of the difficulty of controlling its effect. An example of a suitable formulation is as follows:

EXAMPLE I

| | Pounds |
|---|---|
| Sand | 1000 |
| Soda ash | 335 |
| Limestone | 217 |
| Dolomite | 149 |
| Arsenic trioxide | 10 |
| Copper oxide | 29.25 |
| Nickel oxide (green) | 18.75 |
| Cobalt oxide | 3.65 |

A calculated composition for the glass resulting upon fusion of this batch is as follows:

| | Percent |
|---|---|
| $SiO_2$ | 68.68 |
| $Na_2O$ | 13.40 |
| CaO | 11.35 |
| MgO | 2.20 |
| $Al_2O_3$ | 0.12 |
| $Fe_2O_3$ | 0.04 |
| $As_2O_5$ | 0.68 |
| CuO | 2.00 |
| NiO | 1.28 |
| CoO | 0.25 |

In this example, the MgO content (present in the dolomite) may vary 2 to 5%. Also, the amounts of coloring oxides may be varied as indicated in the following tabulation, which illustrates percentages of such oxides which may be used in various different specific compositions, together with the permissible range of each such coloring component.

Table I

| | No. 1 | No. 2 | No. 3 | No. 4 | No. 5 | Range, percent |
|---|---|---|---|---|---|---|
| CuO | 2.5 | 2.0 | 3.0 | 1.5 | 2.0 | 1.5-3.0 |
| NiO | 0.80 | 2.0 | 0.75 | 0.75 | 1.28 | 0.75-2.0 |
| CoO | 0.28 | 0.14 | 0.25 | 0.35 | 0.25 | 0.1-0.4 |

The spectral transmittance curve shown in the drawing was obtained from a sample, 2 mm. thick, of the improved glass made in accordance with the dolomite glass formulation of Example I. It will be seen that there is provided a transmittance ranging as high as 23% in the region from about 325 to 425 m$\mu$, and substantially zero (0.1%) transmittance throughout the visual portion of the spectrum. The total ultraviolet transmission is about 14%. Even in the region just beyond 700 m$\mu$, corresponding to the near infrared, the transmission is less than 2%.

An alternate formulation in which the components of the base glass are different from those given in Example I is set forth in the following example, including the calculated composition therefor:

EXAMPLE II

BATCH FORMULATION

| | Pounds |
|---|---|
| Sand | 1000 |
| Soda ash | 213 |
| Potassium carbonate | 161 |
| Calcium carbonate | 325 |
| Arsenic trioxide | 10 |
| Copper oxide | 29.7 |
| Nickel oxide | 19.05 |
| Cobalt oxide | 3.7 |

CALCULATED COMPOSITION

| | Percent |
|---|---|
| $SiO_2$ | 67.7 |
| $Na_2O$ | 8.42 |
| $K_2O$ | 7.29 |
| CaO | 12.26 |
| $As_2O_5$ | .68 |
| $R_2O_3$ (iron and aluminum oxides) | .15 |
| Coloring oxides | 3.50 |

In preparing these glasses, the batch is fused and then subjected to fining or removal of gaseous products. Since the compositions defined herein are intended for filter glass purposes, they would normally be made only in pots and minor quantities of ingredients which promote pot fusion and fining, such as the alkali and alkaline earth chlorides, nitrates and sulfates, could be included. It is to be understood that these minor additives will be utilized in accordance with the known art and practices. If made by tank processes, of course, the higher operating temperatures employed therewith would make it unnecessary to use some or all of these minor ingredients or fining agents, as will be apparent to those skilled in the art. This fining operation normally is assisted by mechanical stirring of the melt.

It is considered important to maintain oxidizing conditions in the furnace during the melting and fining cycles for these glasses, so that the desired characteristics are maintained.

In general, the $SiO_2$ content of these glasses can range from 65 to 72% and the alkali metal oxides from 12 to 23%. This alkali metal oxide may be $Na_2O$, $K_2O$ or mixtures of $Na_2O$ and $K_2O$, the $Na_2O$ content varying from 12 to 15% and the $K_2O$ from 0 to 8%. When using $K_2O$ in the glass it will be found necessary, also, to have present some $Na_2O$, usually 2% or more; it is possible, however, to employ $Na_2O$ alone. The CaO content may be varied from 8 to 13%. In the above disclosure and the ensuing claims, percentages are by weight.

The tabulated transmittance data from which the transmittance curve in the drawing was prepared are as follows, the wave lengths indicating the points at which actual measurements were made:

*Table II*

ULTRAVIOLET

| Wavelength, m$\mu$ | Percent transmittance |
|---|---|
| 300 | 0.0 |
| 310 | 0.0 |
| 320 | 0.0 |
| 330 | 0.1 |
| 340 | 1.4 |
| 350 | 5.7 |
| 360 | 12.2 |
| 370 | 19.1 |
| 380 | 23.1 |
| 390 | 20.1 |

VISIBLE

| Wavelength, m$\mu$ | Percent transmittance |
|---|---|
| 400 | 7.3 |
| 420 | 0.3 |
| 440 | 0.1 |
| 460 | 0.1 |
| 480 | 0.1 |
| 500 | 0.2 |
| 520 | 0.1 |
| 540 | 0.1 |
| 560 | 0.2 |
| 580 | 0.1 |
| 600 | 0.1 |
| 620 | 0.1 |
| 640 | 0.1 |
| 660 | 0.1 |
| 680 | 0.2 |
| 700 | 1.3 |
| 720 | 2.0 |
| 740 | 2.0 |
| 750 | 2.0 |

While the invention has been disclosed in connection with a preferred embodiment thereof, and the principles of the invention described, it is to be understood that other variations than those explicitly suggested may be made in the composition and procedure, without departing from the spirit and scope of the invention as defined in the appended claims.

We claim:

1. A glass having substantially the following composition by weight and characterized by relatively high ultraviolet transmission in the radiant energy band from about 325 to 425 millimicrons, and very low visual transmission:

| | Percent |
|---|---|
| $SiO_2$ | 65 to 72 |
| $Na_2O$ | 12 to 15 |
| $K_2O$ | 0 to 8 |
| CaO | 8 to 13 |
| MgO | 0 to 5 |
| CuO | 1.5 to 3 |
| NiO | 0.75 to 2 |
| CoO | 0.1 to 0.4 |

2. A glass having the composition by weight:

| | Percent |
|---|---|
| $SiO_2$ | 68.68 |
| $Na_2O$ | 13.40 |
| CaO | 11.35 |
| MgO | 2.20 |
| $Al_2O_3$ | 0.12 |
| $Fe_2O_3$ | 0.04 |
| $As_2O_5$ | 0.68 |
| CuO | 2.00 |
| NiO | 1.28 |
| CoO | 0.25 | said glass being characterized by very low visual transmission and transmitting freely in the ultraviolet radiant energy band from about 325 to about 425 millimicrons.

References Cited in the file of this patent

UNITED STATES PATENTS

| Number | Name | Date |
|---|---|---|
| 1,122,065 | Brady | Dec. 22, 1914 |

FOREIGN PATENTS

| Number | Country | Date |
|---|---|---|
| 205,381 | Great Britain | 1923 |
| 430,387 | Great Britain | 1935 |